US007839453B2

(12) United States Patent
Takeuchi

(10) Patent No.: US 7,839,453 B2
(45) Date of Patent: Nov. 23, 2010

(54) MOVEMENT COMPENSATION

(75) Inventor: Kesatoshi Takeuchi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1476 days.

(21) Appl. No.: 11/220,656

(22) Filed: Sep. 8, 2005

(65) Prior Publication Data

US 2006/0109265 A1 May 25, 2006

(30) Foreign Application Priority Data

Nov. 19, 2004 (JP) ............................ 2004-335277

(51) Int. Cl.
*H04N 11/20* (2006.01)
*H04N 11/00* (2006.01)
*H04N 5/00* (2006.01)
*G06F 3/038* (2006.01)

(52) U.S. Cl. ....................... 348/447; 348/497; 348/607; 345/204

(58) Field of Classification Search ................. 348/447, 348/497, 607; 345/204
See application file for complete search history.

(56) References Cited

U.S. PATENT DOCUMENTS 4,339,803 A * 7/1982 Michael et al. ............ 708/322
4,639,773 A * 1/1987 Hurst ......................... 348/700
5,923,786 A * 7/1999 Murayama .................. 382/242
6,442,203 B1 * 8/2002 Demos .................. 375/240.16
7,505,080 B2 * 3/2009 Leaback ..................... 348/452
7,630,566 B2 * 12/2009 MacInnis et al. ............ 382/238
7,652,721 B1 * 1/2010 Holt et al. ................... 348/446

FOREIGN PATENT DOCUMENTS

JP A 10-233996 9/1998
JP A 2003-69961 3/2003
JP A 2003-524949 8/2003

* cited by examiner

*Primary Examiner*—Lin Ye
*Assistant Examiner*—Mekonnen Dagnew
(74) *Attorney, Agent, or Firm*—Oliff & Berridge, PLC

(57) ABSTRACT

An image data processor for generating driving image data for operating an image display device, including: an image memory; a write-in control section for sequentially writing-in plural frame image data having a predetermined frame rate to the image memory; a read-out control section for reading-out the frame image data 1 times (1 is an integer of 2 or more) at a rate 1 times the frame rate with every frame image data written into the image memory; and a driving image data generating section for generating the driving image data corresponding to each read-out image data sequentially read out of the image memory.

16 Claims, 11 Drawing Sheets

FRAME MEMORY WRITE-IN IMAGE DATA

FRAME MEMORY READ-OUT IMAGE DATA

DRIVING IMAGE DATA

MOVEMENT COMPENSATION

This Application claims the benefit of Japanese Patent Application No. 2004-335277 filed Nov. 19, 2004. The entire disclosure of the prior application is hereby incorporated by reference herein in its entirety.

BACKGROUND

Aspects of the invention can relate to a movement compensation technique in a case of display of a dynamic image in an image display unit using an image display device called a flat panel such as a liquid crystal panel.

Related art image display units using an image display device, as in the liquid crystal panel, displays the dynamic image by sequentially switching plural frame images at a predetermined frame rate. Therefore, a problem exists in that the displayed dynamic image is intermittently moved. To solve this problem, a related art movement compensation technique for realizing a smooth dynamic image display by generating an interpolating frame image for performing interpolation between two continuous frame images is proposed. See, for example, JP-A-10-233996, JP-T-2003-524949, and JP-A-2003-69961. However, when the movement compensation using the related art technique is applied, it is necessary to arrange a processing circuit of a very large scale including various digital circuits such as a memory, an arithmetic circuit, etc. as a processing circuit for generating the interpolating frame image. There is also a case in which it cannot be the that the quality of the generated interpolating frame image is sufficient.

SUMMARY

An aspect of the invention is to provide a technique for realizing the movement compensation without using the digital circuit of a large scale for generating the interpolating frame image. To achieve at least one advantage of the invention, the image data processor according to an aspect of the invention is an image data processor for generating driving image data for operating an image display device. The image data processor can include an image memory, a write-in control section for sequentially writing-in plural frame image data having a predetermined frame rate to the image memory, a read-out control section for reading-out the frame image data 1 times (1 is an integer of 2 or more) at a rate 1 times the frame rate with every frame image data written into the image memory, and a driving image data generating section for generating the driving image data corresponding to each read-out image data sequentially read out of the image memory. In the read-out image data corresponding to a certain first frame and the read-out image data corresponding to a second frame continued to the first frame, the driving image data generating section sets image data provided by replacing at least one portion of each read-out image data with mask data to the driving image data with respect to first read-out image data of a 1-th period finally read out as the read-out image data corresponding to the first frame, and second read-out image data of the first period firstly read out as the read-out image data corresponding to the second frame. The driving image data generating section also sets the read-out image data to the driving image data as they are with respect to the read-out image data read out in at least one period among the read-out image data except for the first read-out image data of the first frame. Further, the driving image data generating section also sets the read-out image data to the driving image data as they are with respect to the read-out image data read out in at least one period among the read-out image data except for the second read-out image data of the second frame.

In accordance with the above exemplary image data processor, when the image shown by the driving image data generated with respect to the first read-out image data finally read out as the read-out image data of the first frame, and the image shown by the driving image data generated with respect to the second read-out image data firstly read out as the read-out image data of the second frame are continuously displayed in the image display device, an interpolating image between the first frame and the second frame can be formed by utilizing the nature of the sight sense of an afterimage of the eyes of a human being. Thus, the movement of a dynamic image displayed in the image display device can be compensated. Accordingly, it is possible to omit a digital circuit of a large scale for generating the interpolating image as in the conventional case.

Here, a pixel value shown by the mask data can be determined by arithmetically processing the read-out image data corresponding to a pixel arranged in the mask data on the basis of a predetermined parameter determined in accordance with a moving amount of the image shown by the read-out image data corresponding to the generated driving image data. Thus, the movement compensation can be effectively made while restraining the attenuation of a brightness level of the interpolating image displayed in the image display device.

When the pixel value shown by the mask data is determined in accordance with the moving amount of the image as mentioned above, the image data processor can preferably include a moving amount detecting section for detecting the moving amount of the image shown by the frame image data with every frame image data sequentially written into the image memory as the moving amount of the image shown by the read-out image data corresponding to the driving image data, and a parameter determining section for determining the predetermined parameter in accordance with the detected moving amount. Thus, it can be possible to easily determine the predetermined parameter according to the moving amount of the image shown by the read-out image data corresponding to the generated driving image data. The pixel value shown by the mask data can be easily determined by arithmetically processing the read-out image data corresponding to the pixel replaced with the mask data on the basis of the determined predetermined parameter.

A pixel value shown by the mask data may be set to a pixel value showing the image of a predetermined color. In particular, if the predetermined color is set to black, the effect of the movement compensation becomes highest.

In the above image data processor, with respect to the driving image data corresponding to the first read-out image data and the driving image data corresponding to the second read-out image data, it is preferable that the read-out image data and the mask data are alternately arranged every m horizontal lines (m is an integer of 1 or more) of the image displayed by the image display device, and the arranging orders of the read-out image data and the mask data are different from each other. In accordance with the above construction, the movement compensation can be effectively made with respect to the dynamic image including the movement of the vertical direction. In particular, the movement compensation is most effective if m=1 is set.

In the above image data processor, with respect to the driving image data corresponding to the first read-out image data and the driving image data corresponding to the second read-out image data, it is also preferable that the read-out image data and the mask data are alternately arranged every n vertical lines (n is an integer of 1 or more) of the image displayed by the image display device, and the arranging orders of the read-out image data and the mask data are different from each other. In accordance with the above construction, the movement compensation can be effectively made with respect to the dynamic image including the movement of the horizontal direction. In particular, the movement compensation is most effective if n=1 is set.

In the above image data processor, with respect to the driving image data corresponding to the first read-out image data and the driving image data corresponding to the second read-out image data, it is also preferable that the read-out image data and the mask data are alternately arranged in the horizontal direction and the vertical direction of the image displayed in the image display device in a block unit of r-pixels (r is an integer of 1 or more) in the horizontal direction and s-pixels (s is an integer of 1 or more) in the vertical direction, and the arranging orders of the read-out image data and the mask data are different from each other. In accordance with the above construction, the movement compensation can be effectively made with respect to the dynamic image including the movements of the horizontal direction and the vertical direction. In particular, the movement compensation is most effective if r=s=1 is set.

In the above image data processor, the driving image data generating section may switch arranging patterns of the mask data within the driving image data corresponding to the first read-out image data and the driving image data corresponding to the second read-out image data in accordance with a moving direction and a moving amount of the image shown by the read-out image data corresponding to the generated driving image data. In accordance with the above construction, the movement compensation suitable for the movement of the dynamic image desirous to be displayed can be made.

The moving direction and the moving amount of the image shown by the read-out image data corresponding to the generated driving image data can be realized by arranging a moving amount detecting section for detecting the moving direction and the moving amount of the image shown by the frame image data with every frame image data sequentially written into the image memory.

Further, when the above image data processor can have moving amount detecting section for detecting the moving amount of the image shown by the frame image data with every frame image data sequentially written into the image memory as the moving amount of the image shown by the read-out image data corresponding to the generated driving image data. The moving amount detecting section preferably detects the moving direction and the moving amount of the image shown by the frame image data with every frame image data sequentially written into the image memory as the moving direction and the moving amount of the image shown by the read-out image data corresponding to the driving image data.

The image display unit having the above image display device can be constructed by using one of the above image data processors.

It should be understood that the invention is not limited to the mode of a device invention, such as the above image data processor, the image display system, etc., but can be also realized in a mode as a method invention such as an image data processing method, etc. Further, the invention can be also realized in various modes, such as a mode as a computer program for constructing the method and the device, a mode as a recording medium recording, such a computer program, a data signal including that of this computer program and embodied within a carrier wave, etc.

When the invention is constructed as a computer program, or a recording medium, etc. recording this program, the invention may be constructed as the entire program for controlling the operation of the above device, and only a portion fulfilling a function of the invention may be also constructed. Further, as the recording medium, it is possible to utilize various media able to be read by a computer as in a flexible disk, CD-ROM, DVD-ROM/RAM, a magneto-optic disk, an IC card, a ROM cartridge, a punch card, a printed matter printed with codes such as a bar code, etc., an internal memory device (a memory, such as RAM, ROM, etc.) of the computer, and an external memory device, etc.

BRIEF DESCRIPTION OF THE DRAWINGS

The invention will be described with reference to the accompanying drawings, wherein like numbers reference like elements, and wherein.

DETAILED DESCRIPTION OF EMBODIMENTS

Modes for carrying out the invention will next be explained in the following order on the basis of exemplary embodiments.

Figure 1:
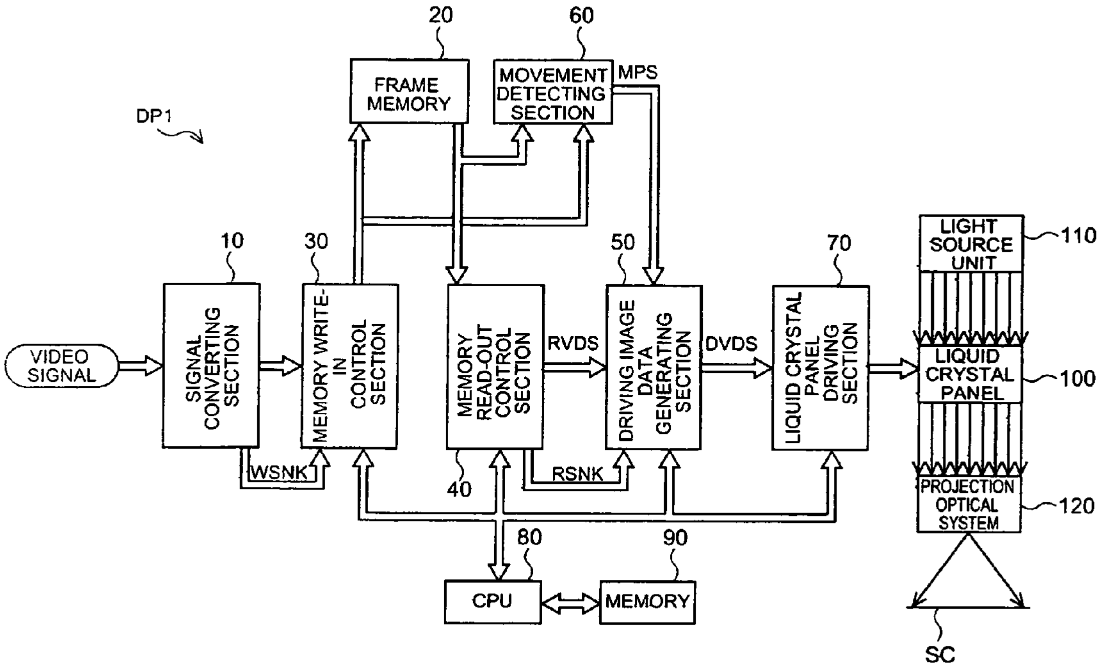
FIG. 1 is a block diagram showing the construction of an image display unit applying an image data processor as a first exemplary embodiment of this invention.

FIG. 1 is a block diagram showing the construction of an image display unit applying an image data processor as a first exemplary embodiment of this invention. This image display unit DP1 is a computer system having a signal converting section 10 as the image data processor, a frame memory 20, a memory write-in control section 30, a memory read-out control section 40, a driving image data generating section 50, a movement detecting section 60, a liquid crystal panel driving section 70, a CPU 80, a memory 90, and a liquid crystal panel 100 as an image display device. This image display unit DP1 has various peripheral devices, such as an external memory device, an interface, etc. arranged in the general computer system, but these peripheral devices are here omitted in the drawings.

The image display unit DP1 is a projector, and converts illumination light emitted from a light source unit 110 into light (image light) showing an image by the liquid crystal panel 100. The image display unit DP1 further forms this image light as an image on a projection screen SC by using a projection optical system 120. Thus, the image display unit DP1 projects the image onto the projection screen SC. The liquid crystal panel driving section 70 can be also considered as a block included in the image display device together with the liquid crystal panel 100 instead of the image data processor.

The CPU 80 controls the operation of each block by reading and executing a control program and a processing condition stored to the memory 90.

The signal converting section 10 is a processing circuit for converting a video signal inputted from the exterior into a signal able to be processed by the memory write-in control section 30. For example, in the case of an analog video signal, the signal converting section 10 converts the analog video signal into a digital video signal in synchronization with a synchronous signal included in the video signal. In the case of a digital video signal, the signal converting section 10 converts the digital video signal into a signal of a format able to be processed by the memory write-in control section 30 in accordance with the kind of this digital video signal.

The memory write-in control section 30 sequentially writes the image data of each frame included in the digital video signal outputted from the signal converting section 10 into the frame memory 20 in synchronization with a synchronous signal WSNK (a write-in synchronous signal) for write-in corresponding to this digital video signal. A write-in vertical synchronous signal, a write-in horizontal synchronous signal and a write-in clock signal are included in the write-in synchronous signal WSNK.

The memory read-out control section 40 can generate a synchronous signal RSNK (a read-out synchronous signal) for read-out on the basis of a read-out control condition given from the memory 90 through the CPU 80. The memory read-out control section 40 also reads-out the image data stored to the frame memory 20 in synchronization with this read-out synchronous signal RSNK. The memory read-out control section 40 then outputs a read-out image data signal RVDS and the read-out synchronous signal RSNK to the driving image data generating section 50. A read-out vertical synchronous signal, a read-out horizontal synchronous signal and a read-out clock signal are included in the read-out synchronous signal RSNK. The period of the read-out vertical synchronous signal is set to twice the frequency (frame rate) of the write-in vertical synchronous signal of the video signal written to the frame memory 20. The memory read-out control section 40 twice reads the image data stored to the frame memory 20 during one frame period, and outputs these image data to the driving image data generating section 50.

The driving image data generating section 50 generates a driving image data signal DVDS for operating the liquid crystal panel 100 through the liquid crystal panel driving section 70 on the basis of the read-out image data signal RVDS and the read-out synchronous signal RSNK supplied from the memory read-out control section 40, and a mask parameter signal MPS supplied from the movement detecting section 60. The driving image data generating section 50 then outputs the generated driving image data signal DVDS to the liquid crystal panel driving section 70. The construction and operation of the driving image data generating section 50 will be further described later.

The movement detecting section 60 detects a movement with respect to the image data of each frame (hereinafter also called frame image data) sequentially written into the frame memory 20, and the read-out image data corresponding to the previous frame image data and read out of the frame memory 20. The mask parameter signal MPS determined in accordance with this moving amount is outputted to the driving image data generating section 50. The construction and operation of the movement detecting section 60 will be further described in greater detail below.

The liquid crystal panel driving section 70 converts the driving image data signal DVDS supplied from the driving image data generating section 50 into a signal able to be supplied to the liquid crystal panel 100, and supplies this converted signal to the liquid crystal panel 100.

The liquid crystal panel 100 emits image light showing an image corresponding to the supplied driving image data signal. Thus, the image shown by the image light emitted from the liquid crystal panel 100 is projected and displayed onto the projection screen SC as mentioned above.

Figure 2:
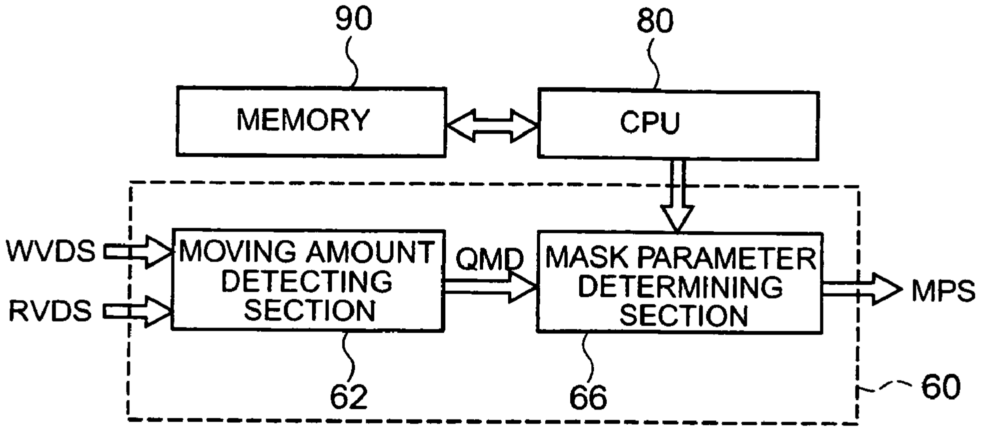
FIG. 2 is a schematic block diagram showing one example of the construction of a movement detecting section 60.

FIG. 2 is a schematic block diagram showing one example of the construction of the movement detecting section 60. The movement detecting section 60 has a moving amount detecting section 62 and a mask parameter determining section 66.

The moving amount detecting section 62 divides frame image data (object data) WVDS written into the frame memory 20 and the frame image data (reference data) RVDS read out of the frame memory 20 into a rectangular pixel block of p×q pixels (p and q are integers of 2 or more). The moving amount detecting section 62 further calculates a movement vector between two frames with respect to each block. Thus, the moving amount detecting section 62 can calculate the magnitude of this movement vector as a moving amount of each block. The moving amount detecting section 62 then calculates a sum total of the calculated moving amount of each block. The sum total of the above calculated moving amount of each block corresponds to the moving amount of the image between the two frames. For example, the movement vector of each block can be easily calculated by calculating the moving amounts of gravity center coordinates of pixel data (brightness data) included in the block. Various general methods can be used as a technique for calculating the movement vector. Accordingly, its concrete explanation is omitted here. The calculated moving amount is supplied to the mask parameter determining section 66 as moving amount data QMD.

The mask parameter determining section 66 calculates the value of a mask parameter MP according to the moving amount shown by the moving amount data QMD supplied from the moving amount detecting section 62. Data showing the calculated value of the mask parameter MP are outputted to the driving image data generating section 50 as the mask parameter signal MPS.

Table data showing the relation of an amount provided by normalizing the moving amount of the image and the value of the mask parameter corresponding to this normalized amount are read and supplied from the memory 90 by the CPU 80, and are thereby stored to the mask parameter determining section 66 in advance. Thus, the value of the mask parameter MP according to the moving amount shown by the supplied moving amount data QMD is calculated in the mask parameter determining section 66 with reference to these table data. Here, the case using the table data is explained as an example, but a function calculation using a polynomial as an approximate formula may be also used.

Figure 3:
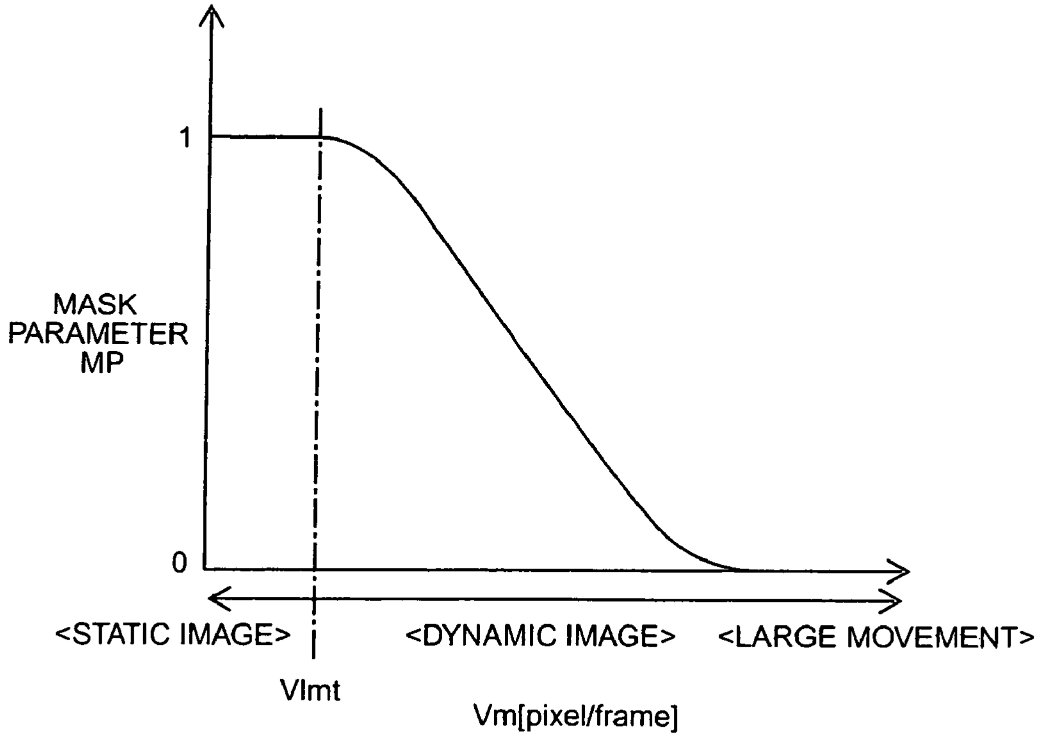
FIG. 3 is an explanatory view showing table data stored to a mask parameter determining section 66.

FIG. 3 is an explanatory view showing the table data stored to the mask parameter determining section 66. As shown in FIG. 3, these table data show characteristics of the value (0 to 1) of the mask parameter MP with respect to the moving amount Vm. The moving amount Vm is shown by a pixel number moved in a frame unit, i.e., a moving speed in the unit of [pixel/frame]. As this moving amount Vm is increased, the image is violently moved. Therefore, it is considered that the smoothness of the dynamic image is damaged. Therefore, when the moving amount Vm is a judgment reference value Vlmt or less, these table data are judged as no movement, and the value of the mask parameter MP is set to 1. Further, when the moving amount Vm is greater than the judgment reference value Vlmt, it is judged that there is a movement, and the value of the mask parameter MP is set to the range of 0 to 1 so as to be close to 0 as the moving amount Vm is increased, and be close to 1 as the moving amount Vm is decreased.

The mask parameter determining section 66 may be also set to a block included in the driving image data generating section 50 instead of the movement detecting section 60, particularly, a block included in a mask data generating section 530 described in greater detail below. Further, the movement detecting section 60 may be also entirely set to a block included in the driving image data generating section 50.

Figure 4:
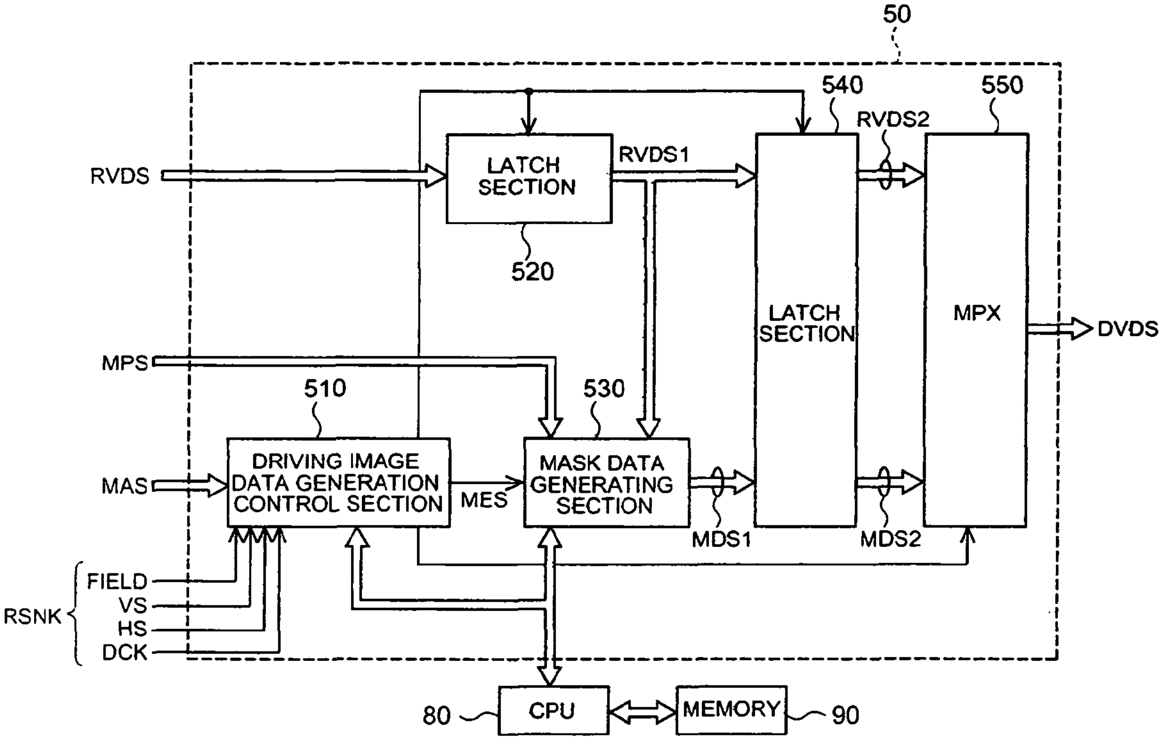
FIG. 4 is a schematic block diagram showing one example of the construction of a driving image data generating section 50.

FIG. 4 is a schematic block diagram showing one example of the construction of the driving image data generating section 50. The driving image data generating section 50 has a driving image data generation control section 510, a first latch section 520, a mask data generating section 530, a second latch section 540 and a multiplexer (MPX) 550.

The driving image data generation control section 50 outputs a latch signal LTS for controlling the operations of the first latch section 520 and the second latch section 540, a selecting control signal MXS for controlling the operation of the multiplexer 550, and an enable signal MES for controlling the operation of the mask data generating section 530 on the basis of a read-out vertical synchronous signal VS, a read-out horizontal synchronous signal HS, a read-out clock DCK and a field selecting signal FIELD included in the read-out synchronous signal RSNK supplied from the memory read-out control section 40, and a moving area data signal MAS supplied from the movement detecting section 60. The driving image data generation control section 510 then controls the generation of the driving image data signal DVDS. The field selecting signal FIELD is a signal for distinguishing whether the read-out image data signal RVDS read out of the frame memory 20 at a double speed is a read-out image data signal of a first field or a read-out image data signal of a second field.

The first latch section 520 sequentially latches the read-out image data signal RVDS supplied from the memory read-out control section 40 in accordance with the latch signal LTS supplied from the driving image data generation control section 510. The first latch section 520 then outputs the read-out image data after the latch to the mask data generating section 530 and the second latch section 540 as a read-out image data signal RVDS1.

When the generation of the mask data is allowed by the enable signal MES supplied from the driving image data generation control section 510, the mask data generating section 530 generates the mask data showing a pixel value according to the pixel value shown by the read-out image data of each pixel on the basis of the mask parameter signal MPS supplied from the movement detecting section 60 and the read-out image data signal RVDS1 supplied from the first latch section 520. The mask data generating section 530 then outputs the generated mask data to the second latch section 540 as a mask data signal MDS1.

Figure 5:
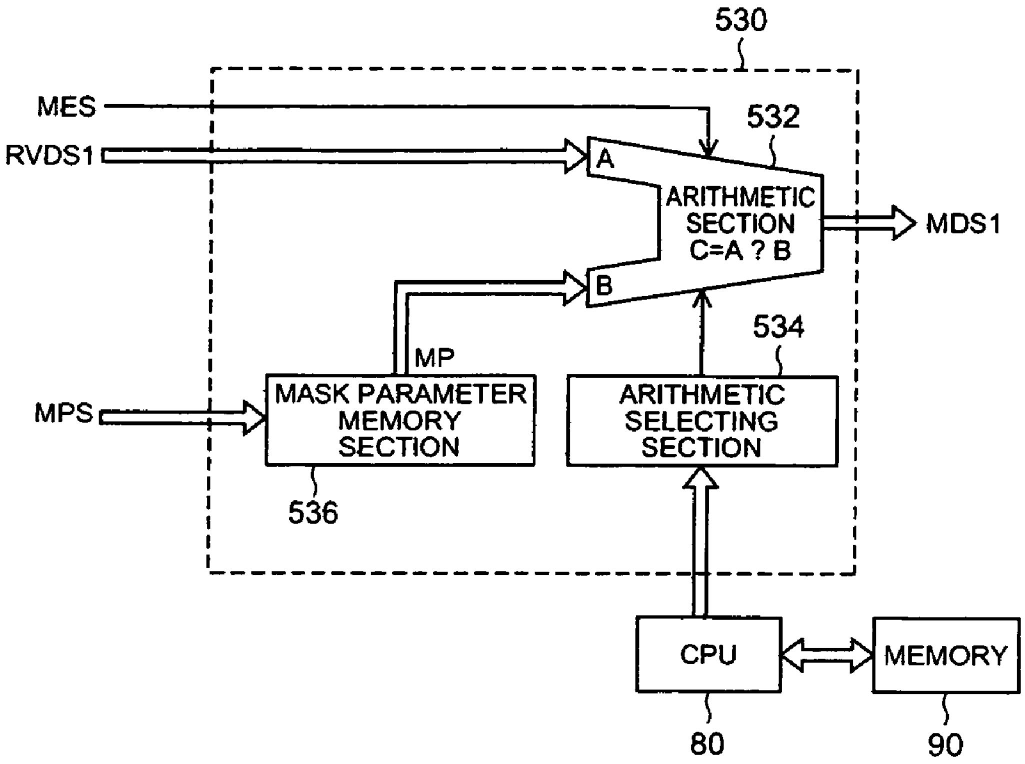
FIG. 5 is a schematic block diagram showing one example of the construction of a mask data generating section 530.

FIG. 5 is a schematic block diagram showing an exemplary construction of the mask data generating section 530. The mask data generating section 530 has an arithmetic section 532, an arithmetic selecting section 534 and a mask parameter memory section 536.

The arithmetic selecting section 534 receives a mask data generating condition set in advance and stored to the memory 90 by instructions from the CPU 80, and selects and sets an arithmetic calculation corresponding to the received mask data generating condition to the arithmetic section 532. For example, various arithmetic calculations, such as a multiplying calculation, a bit shift arithmetic calculation etc. can be utilized as the arithmetic calculation executed by the arithmetic section 532. In this exemplary embodiment, the multiplying calculation (C=A*B) is selectively set as the arithmetic calculation executed in the arithmetic section 532.

The mask parameter memory section 536 stores the value of the mask parameter MP shown by the mask parameter signal MPS supplied from the movement detecting section 60. The value of the mask parameter MP stored to the mask parameter memory section 536 is supplied to the arithmetic section 532 as the value of an arithmetic parameter B of the arithmetic section 532.

The arithmetic section 532 sets the read-out image data within the inputted read-out image data signal RVDS1 to the arithmetic parameter A, and also sets the mask parameter MP supplied from the mask parameter memory section 536 to the arithmetic parameter B. The arithmetic section 532 executes the arithmetic calculation (A?B:? is an operator showing a selected arithmetic calculation) selected by the arithmetic selecting section 534 when the arithmetic calculation is allowed by the enable signal MES. The arithmetic section 532 then outputs the mask data as its arithmetic result C (=A?B) as the mask data signal MDS1. Thus, the mask data according to the moving amount are generated on the basis of the read-out image data of each pixel with respect to each pixel of the image shown by the inputted read-out image data RVDS1.

For example, as mentioned above, it is supposed that the multiplying calculation (C=A*B) is selectively set as the arithmetic calculation executed in the arithmetic section 532, and "0.3" as the value of the mask parameter MP is set to the mask parameter memory section 536 as the arithmetic parameter B. At this time, when the value of the read-out image data within the read-out image data signal RVDS1 inputted as the arithmetic parameter A is "00h", "32h" and "FFh", the arithmetic section 532 respectively outputs mask data having the values of "00h", "0Fh" and "4Ch" as the mask data signal MDS1.

In this example, the multiplying calculation is selectively set as the arithmetic calculation executed in the arithmetic section 532. As shown in FIG. 3, the case for setting the value of the range of 0 to 1 as the value of the mask parameter MP has been explained as an example. However, as mentioned above, for example, when a bit shift arithmetic calculation is selected, the value of the mask parameter MP determined by the mask parameter determining section 66 (FIG. 2) becomes a bit shift amount, and the table data and the function set to the mask parameter determining section 66 (FIG. 2) become table data and a function according to this bit shift amount. Namely, the value of the mask parameter MP determined by the mask parameter determining section 66 becomes a value according to the arithmetic calculation executed by the arithmetic section 532.

The second latch section 540 of FIG. 4 sequentially latches the read-out image data signal RVDS1 outputted from the first latch section 520 and the mask data signal MDS1 outputted from the mask data generating section 530 in accordance with the latch signal LTS. The second latch section 540 then outputs the read-out image data after the latch to the multiplexer 550 as a read-out image data signal RVDS2, and outputs the mask data after the latch to the multiplexer 550 as a mask data signal MDS2.

The multiplexer 550 generates the driving image data signal DVDS by selecting one of the read-out image data signal RVDS2 and the mask data signal MDS2 in accordance with a selecting control signal MXS outputted from the driving image data generation control section 510. The multiplexer 550 then outputs the driving image data signal DVDS to the liquid crystal panel driving section 70.

The selecting control signal MXS is generated on the basis of the field signal FIELD, the read-out vertical synchronous signal VS, the read-out horizontal synchronous signal HS and the read-out clock DCK such that the pattern of the mask data replaced with the read-out image data and arranged becomes a predetermined mask pattern.

Figures 6A, 6B, 6C:
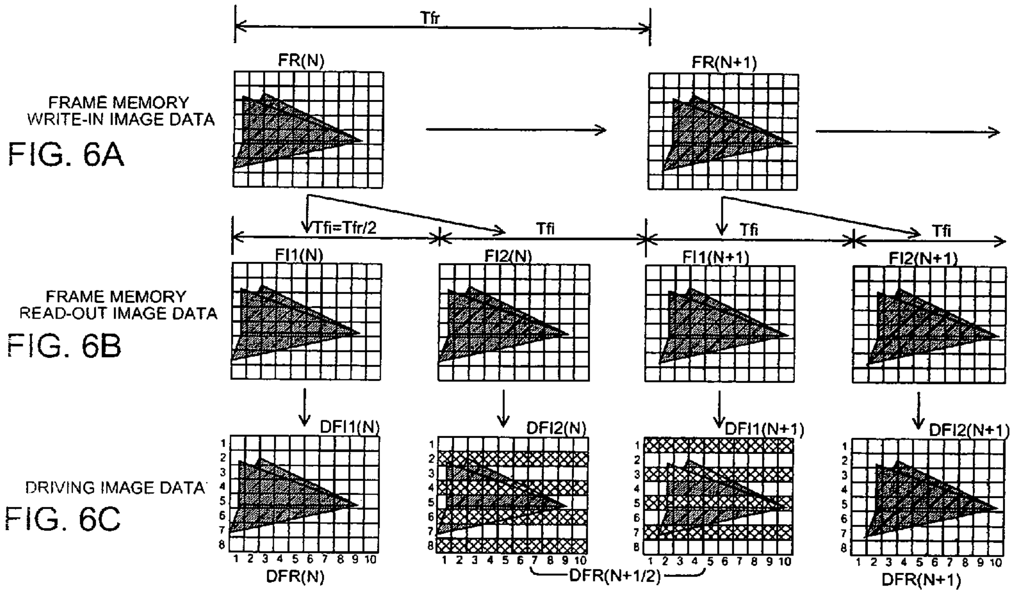
FIGS. 6A to 6C are explanatory views showing generated driving image data.

FIGS. 6A to 6C are explanatory views showing the generated driving image data. As shown in FIG. 6A, the frame image data of each frame are stored to the frame memory 20 by the memory write-in control section 30 (FIG. 1) during a constant period (frame period) Tfr. FIG. 6A shows a case in which frame image data FR(N) of an N-th frame (hereinafter simply called N-th frame) and frame image data FR(N+1) of an (N+1)-th frame (hereinafter simply called (N+1)-th frame) are sequentially stored to the frame memory 20 as an example. When a head frame is set to a first frame, N is set to an odd number of 1 or more. When the head frame is set to a zeroth frame, N is set to an even number including 0.

As this time, as shown in FIG. 6B, the frame image data stored to the frame memory 20 are read twice by the memory read-out control section 40 (FIG. 1) in a period (field period) Tfi having a speed twice that of the frame period Tfr, and are sequentially outputted as read-out image data FI1 corresponding to a first field and read-out image data FI2 corresponding to a second field. FIG. 6B shows a case in which read-out image data FI1(N) of the first field and read out image data FI2(N) of the second field in the N-th frame, and read-out image data FI1(N+1) of the first field and read-out image data FI2(N+1) of the second field in the (N+1)-th frame are sequentially outputted as an example.

As shown in FIG. 6C, the driving image data generating section 50 (FIG. 4) executes the generation of the driving image data every combination of two frame images of continuous odd and even numbers. FIG. 6C shows driving image data DFI1(N), DFI2(N), DFI1(N+1), DFI2(N+1) generated with respect to the combination of continuous N-th frame and (N+1)-th frame.

The read-out image data FI1(N) of the first field in the N-th frame and the read-out image data FI2(N+1) of the second field in the (N+1)-th frame are respectively set to driving image data DFI1(N) and DFI2(N+1) as they are.

With respect to the read-out image data FI2(N) and FI1(N+1) at the boundary of the N-th frame and the (N+1)-th frame, one portion within the read-out image data is replaced with the mask data (an area shown by cross hatching in FIGS. 6A to 6C) generated in the mask data generating section 530 by the arithmetic processing in the mask data generating section 530 and the selection processing in the multiplexer 550. Driving image data DFI2(N) corresponding to the read-out image data FI2(N) of the second field of the N-th frame, and driving image data DFI1(N+1) corresponding to the read-out image data FI1(N+1) of the first field of the (N+1)-th frame are then generated. Specifically, with respect to the read-out image data FI2(N) of the second field of the N-th frame, driving image data DFI2(N) provided by replacing data on the horizontal line of an even number with the mask data are generated. Further, with respect to the read-out image data FI(N) of the first field of the (N+1)-th frame, driving image data DFI1(N+1) provided by replacing data on the horizontal line of an odd number with the mask data are generated. In this case, with respect to the driving image data DFI2(N) corresponding to the second field of the N-th frame, data on the horizontal line of an odd number may be also replaced with the mask data. Further, with respect to the driving image data DFI2 of the first field of the (N+1)-th frame, data on the horizontal line of an even number may be also replaced with the mask data.

The image shown by the driving image data illustrated in FIGS. 6A to 6C is set to an image of 8 horizontal lines and 10 vertical lines with respect to the image of one frame, to easily make the explanation. Therefore, this image is seen as a discrete image, but the actual image has several hundred horizontal and vertical lines. Accordingly, even when the mask data are arranged every horizontal one line, this arrangement is almost inconspicuous in the sight sense of a human being.

Here, first driving image data DFI1(N) in the frame period of the N-th frame are read-out image data FI1(N) of the first field, and a frame image DFR(N) of the N-th frame is shown by this first driving image data DFI1(N).

Similarly, second driving image data DFI2(N+1) in the frame period of the (N+1)-th frame are read-out image data FI2(N) of the second field, and a frame image DFR(N+1) of the (N+1)-th frame is shown by this second driving image data DFI2(N+1).

The second driving image data DFI2(N) in the frame period of the N-th frame are read-out image data FI2(N) of the second field in the N-th frame. The first driving image data DFI1(N+1) in the frame period of the (N+1)-th frame are read-out image data FI1(N+1) of the first field in the (N+1)-th frame. Further, in the second driving image data DFI2(N) in the N-th frame, the mask data are arranged on the horizontal line of an even number. In the first driving image data DFI1 (N+1) in the (N+1)-th frame, the mask data are arranged on the horizontal line of an odd number. The arrangement relation of the read-out image data and the mask data is mutually set to an opposite relation. Therefore, an interpolating image DFR(N+1/2) for performing interpolation between the N-th frame and the (N+1)-th frame is shown by the second driving image data DFI2(N) of the N-th frame and the first driving image data DFI1(N+1) of the (N+1)-th frame utilizing the nature of the sight sense of an afterimage of the eyes of a human being. Accordingly, the compensation can be made such that the displayed dynamic image shows a smooth movement. Thus, the movement of the displayed dynamic image can be compensated without arranging a circuit for the movement compensation of a large scale as in the conventional example. Further, the compensation can be also made so as to reduce the afterimage phenomenon due to the sight sense of a human being with respect to the movement, and provide the smooth movement. Furthermore, the compensation can be also made so as to restrain the disturbance of a color balance caused by the afterimage phenomenon due to the sight sense of a human being, and provide an excellent color balance.

In the above exemplary embodiment, the case that the read-out image data and the mask data are alternately arranged every one horizontal line is shown as an example as shown in FIGS. 6A to 6C. However, the read-out image data and the mask data may be also alternately arranged every m (m is an integer of 1 or more) horizontal lines. In this case, similar to the exemplary embodiment the interpolation can be effectively performed between two frames by utilizing the nature of the sight sense of a human being every combination of two continuous frames. Accordingly, the compensation can be made such that the displayed dynamic image shows a smooth movement. Further, the compensation can be also made so as to reduce the afterimage phenomenon due to the sight sense of a human being with respect to the movement, and provide the smooth movement. Furthermore, the compensation can be also made so as to restrain the disturbance of a color balance caused by the afterimage phenomenon due to the sight sense of a human being with respect to the movement, and provide an excellent color balance.

Figures 7A, 7B, 7C:
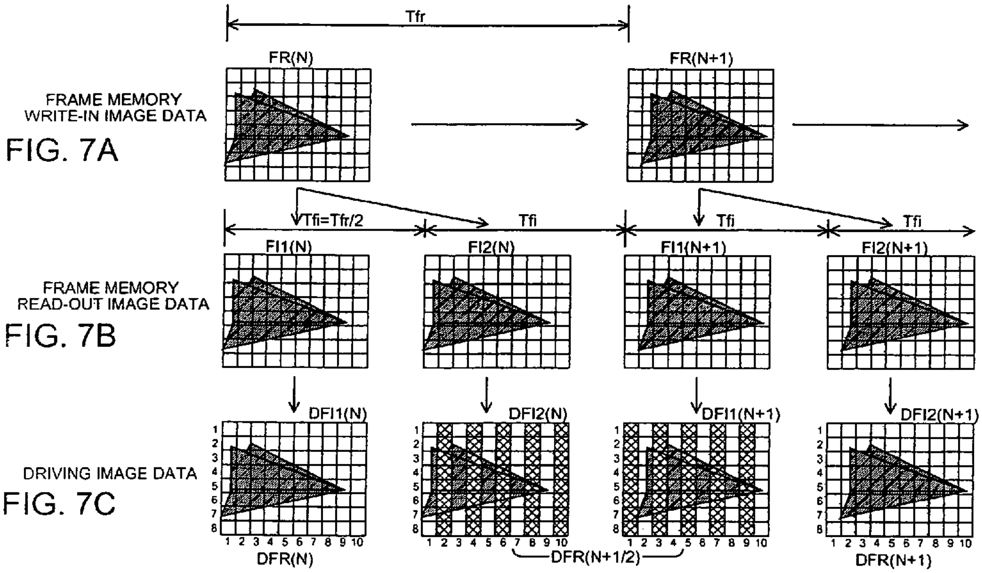
FIGS. 7A to 7C are explanatory views showing a second modified example of the generated driving image data.

FIGS. 7A to 7C are explanatory views showing a second modified example of the generated driving image data. As shown in FIG. 7C, in the driving image data DFI2(N) corresponding to the second field of the N-th frame, each pixel forming the vertical line of an even number is replaced with the mask data (an area shown by cross hatching). In the driving image data DFI2(N+1) corresponding to the first field of the (N+1)-th frame, each pixel forming the vertical line of an odd number is replaced with the mask data. In the driving image data DFI2(N), each pixel forming the vertical line of an odd number may be also replaced with the mask data. In the driving image data DFI2(N+1), each pixel forming the vertical line of an even number may be also replaced with the mask data.

In this modified example, the interpolating image DFR(N+½) for performing the interpolation between the N-th frame and the (N+1)-th frame is also shown by the second driving image data DFI2(N) of the N-th frame and the first driving image data DFI1(N+1) of the (N+1)-th frame utilizing the nature of the sight sense of an afterimage of the eyes of a human being. Thus, the movement of the displayed dynamic image can be compensated without arranging a circuit for the movement compensation of a large scale as in the conventional example. Further, the compensation can be also made so as to reduce the afterimage phenomenon due to the sight sense of a human being with respect to the movement, and provide a smooth movement. Furthermore, the compensation can be also made so as to restrain the disturbance of a color balance caused by the afterimage phenomenon due to the sight sense of a human being with respect to the movement, and provide an excellent color balance.

In particular, when the read-out image data with respect to the pixel forming the vertical line are replaced with the mask data as in this modified example, it is more effective to compensate for the movement including the movement in the horizontal direction in comparison with the case in which the read-out image data with respect to the horizontal line are replaced with the mask data as in the exemplary embodiment. However, it is more effective to compensate for the movement including the movement of the vertical direction in the exemplary embodiment in comparison with this modified example.

FIGS. 7A to 7C show a case in which the read-out image data and the mask data are alternately arranged every one vertical line as an example. However, the read-out image data and the mask data may be also alternately arranged every n (n is an integer of 1 or more) vertical lines. In this case, similar to the modified example 2, the interpolation can be effectively performed between two frames by utilizing the nature of the sight sense of a human being every combination of two continuous frames. Accordingly, the compensation can be made such that the displayed dynamic image shows a smooth movement. Further, the compensation can be also made so as to reduce the afterimage phenomenon due to the sight sense of a human being with respect to the movement, and provide the smooth movement. Furthermore, the compensation can be also made so as to restrain the disturbance of a color balance caused by the afterimage phenomenon due to the sight sense of a human being with respect to the movement, and provide an excellent color balance. In particular, it is more effective to compensate for the movement including the movement in the horizontal direction.

Figures 8A, 8B, 8C:
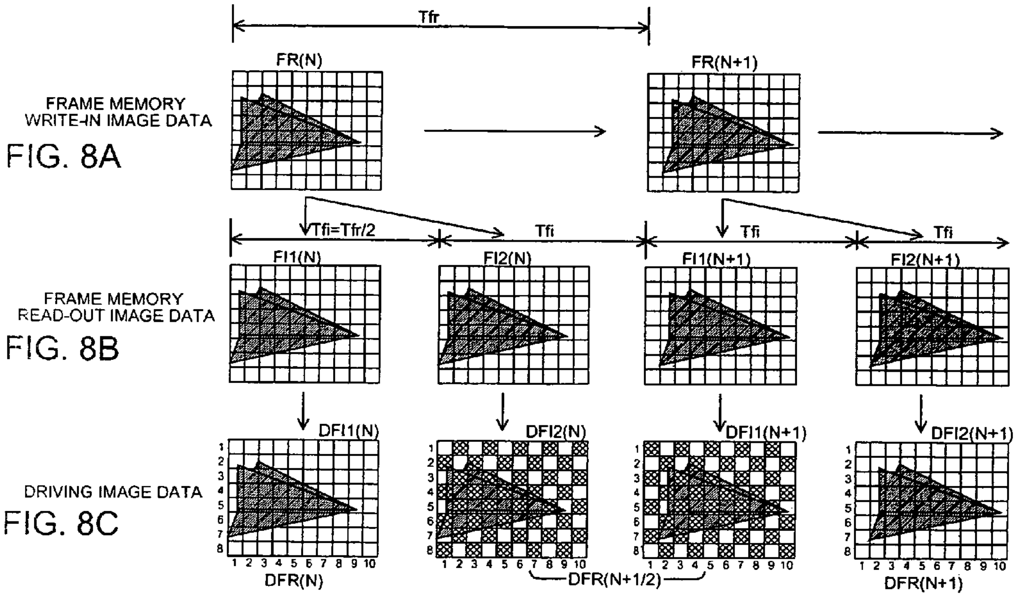
FIGS. 8A to 8C are explanatory views showing a fourth modified example of the generated driving image data.

FIGS. 8A to 8C are explanatory views showing a fourth modified example of the generated driving image data. As shown in FIG. 8C, in the driving image data DFI2(N) corresponding to the second field of the N-th frame and the driving image data DFI1(N+1) corresponding to the first field of the (N+1)-th frame, the mask data (an area shown by cross hatching) and the read-out image data are alternately arranged every one of pixels arranged in the horizontal direction and the vertical direction. However, in the driving image data DFI2(N) and the driving image data DFI1(N+1), the arranging positions of the mask data and the read-out image data are opposed to each other. In the example of FIGS. 8A to 8C, in the driving image data DFI1(N), the pixel of an even number on the horizontal line of an odd number and the pixel of an odd number on the horizontal line of an even number are set to the mask data. In the driving image data DFI2(N), the pixel of an odd number on the horizontal line of an odd number and the pixel of an even number on the horizontal line of an even number are set to the mask data. In the driving image data DFI1(N), the pixel of an odd number on the horizontal line of an odd number and the pixel of an even number on the horizontal line of an even number may be also set to the mask data. In the driving image data DFI2(N), the pixel of an even number on the horizontal line of an odd number and the pixel of an odd number on the horizontal line of an even number may be also set to the mask data.

In this modified example, the interpolating image DFR(N+1/2) for performing the interpolation between the N-th frame and the (N+1)-th frame is also shown by the second driving image data DFI2(N) of the N-th frame and the first driving image data DFI1(N+1) of the (N+1)-th frame utilizing the nature of the sight sense of an afterimage of the eyes of a human being. Thus, the movement of the displayed dynamic image can be compensated without arranging a circuit for the movement compensation of a large scale as in the conventional example. Further, the compensation can be also made so as to reduce the afterimage phenomenon due to the sight sense of a human being with respect to the movement, and provide a smooth movement. Furthermore, the compensation can be also made so as to restrain the disturbance of a color balance caused by the afterimage phenomenon due to the sight sense of a human being with respect to the movement, and provide an excellent color balance.

In particular, when the mask data are arranged in a checker flag shape as in this modified example, it is possible to obtain both a compensation effect of the movement including the movement of the vertical direction as in the exemplary embodiment and a compensation effect of the movement including the movement of the horizontal direction as in the second modified example.

FIGS. 8A to 8C show the case in which the read-out image data and the mask data are alternately arranged in one pixel unit in the horizontal direction and the vertical direction as an example. However, the read-out image data and the mask data may be also alternately arranged in the horizontal direction and the vertical direction in a block unit of r-pixels (r is an integer of 1 or more) in the horizontal direction and s-pixels (s is an integer of 1 or more) in the vertical direction. In this case, similar to the modified example 4, the interpolation can be effectively performed between two frames by utilizing the nature of the sight sense of a human being every two continuous frames combination. Accordingly, the compensation can be made such that the displayed dynamic image shows a smooth movement. Further, the compensation can be also made so as to reduce the afterimage phenomenon due to the sight sense of a human being with respect to the movement, and provide the smooth movement. Furthermore, the compensation can be also made so as to restrain the disturbance of a color balance caused by the afterimage phenomenon due to the sight sense of a human being with respect to the movement, and provide an excellent color balance. In particular, it is more effective to compensate the movement including the movements in the horizontal direction and the vertical direction.

In the first exemplary embodiment, the explanation is made with respect to the case in which the frame image data stored to the frame memory 20 are read twice in the period Tfi having a speed twice that of the frame period Tfr, and the driving image data corresponding to each read-out image data are generated. However, the frame image data stored to the frame memory 20 may be also read in a period having a speed three times or more that of the frame period Tfr, and the driving image data corresponding to each read-out image data may be also generated.

Figures 9A, 9B, 9C:
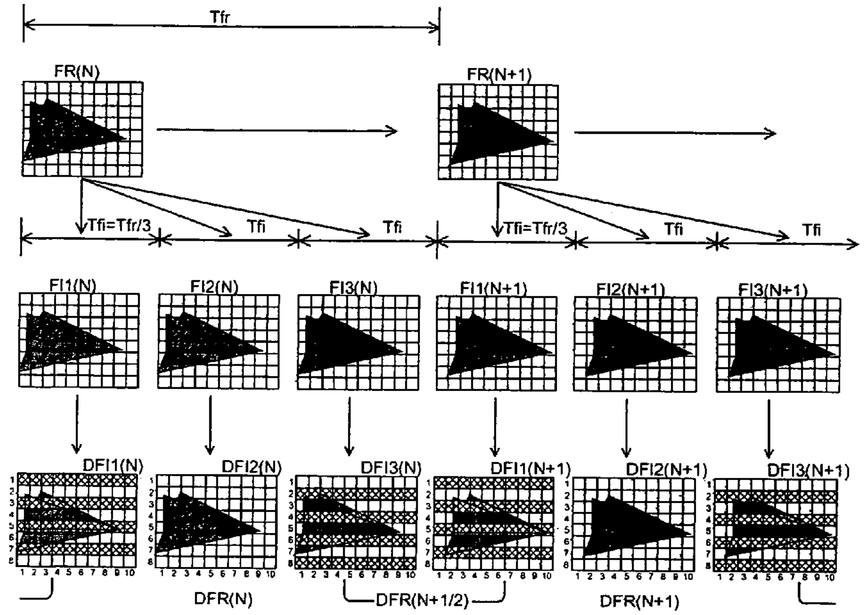
FIGS. 9A to 9C are an explanatory view showing driving image data generated in a second exemplary embodiment.

FIG. 9 is an explanatory view showing the driving image data generated in the second exemplary embodiment. FIG. 9 shows a case in which the frame image data of the N-th frame (N is an integer of 1 or more) and the frame image data of the (N+1)-th frame are read, and the driving image data are generated. Concretely, as shown in FIG. 9B, the frame image data stored to the frame memory 20 are read three times in a period Tfi having a speed three times that of the frame period Tfr, and are sequentially outputted as first to third read-out image data FI1 to FI3. As shown in FIG. 9C, the driving image data DFI1 are generated with respect to the first read-out image data FI1, and the driving image data DFI2 are generated with respect to the second read-out image data FI2, and the driving image data DFI3 are generated with respect to the third read-out image data FI3.

The construction of the image display unit in the second exemplary embodiment is basically the same as the first exemplary embodiment except for the difference in the reading-out period of the frame image data stored to the frame memory 20. Accordingly, the illustration and the explanation of this image display unit in the second exemplary embodiment are omitted.

In the three driving image data DFI1 to DFI3 generated in one frame, the first and third driving image data DFI1, DFI3 are set to image data in which one portion of the read-out image data is replaced with the mask data. In FIG. 9C, in the first driving image data DFI1, the data on the horizontal line of an odd number are replaced with the mask data (an area shown by cross hatching). In the third driving image data DFI3, the data on the horizontal line of an even number are replaced with the mask data. The second driving image data DFI2 are the same image data as the read-out image data FI2.

Here, the second driving image data DFI2(N) in the frame period of the N-th frame (N is an integer of 1 or more) are the read-out image data FI2(N) in which the frame image data FR(N) of the N-th frame are read out of the frame memory 20. Accordingly, the frame image DFR(N) of the N-th frame is shown by these driving image data DFI2(N).

The second driving image data DFI2(N+1) in the frame period of the (N+1)-th frame are also the read-out image data FI2(N+1) in which the frame image data FR(N+1) of the (N+1)-th frame are read out of the frame memory 20. Accordingly, the frame image DFR(N+1) of the (N+1)-th frame is shown by these driving image data DFI2(N+1).

The third driving image data DFI3(N) in the frame period of the N-th frame are third read-out image data FI3(N) in the N-th frame. The first driving image data DFI1(N+1) in the frame period of the (N+1)-th frame are first read-out image data FI1(N+1) in the (N+1)-th frame. Further, in the third driving image data DFI3(N) in the N-th frame, the mask data are arranged on the horizontal line of an even number. In the first driving image data DFI1(N+1) in the (N+1)-th frame, the mask data are arranged on the horizontal line of an odd number. These arrangements are mutually set to an opposite relation. Therefore, an interpolating image DFR(N+½) for performing the interpolation between the N-th frame and the (N+1)-th frame is shown by the third driving image data DFI3(N) of the N-th frame and the first driving image data DFI1(N+1) of the (N+1)-th frame utilizing the nature of the sight sense of an afterimage of the eyes of a human being.

The compensation can be made such that the displayed dynamic image shows a smooth movement. The interpolation can be also similarly performed between the frames by third driving image data DFI3(N−1) of an unillustrated (N−1)-th frame, and first driving image data DFI1(N) of the N-th frame, third driving image data DFI3(N+1) of the (N+1)-th frame, and first driving image data DFI1(N+2) of an unillustrated (N+2)-th frame. Thus, the movement of the displayed dynamic image can be compensated without arranging a circuit for the movement compensation of a large scale as in the conventional example.

Further, the compensation can be also made so as to reduce the afterimage phenomenon due to the sight sense of a human being with respect to the movement, and provide a smooth movement. Furthermore, the compensation can be also made so as to restrain the disturbance of a color balance caused by the afterimage phenomenon due to the sight sense of a human being, and provide an excellent color balance.

In particular, when the image data are read in the period of a double speed as in the first exemplary embodiment, the movement can be compensated every two continuous frames combination. However, in the case of this modified example, each of the movements between adjacent frames can be compensated. Accordingly, there is an advantage in that the effect of the movement compensation is further raised.

Similar to the first exemplary embodiment, the explanation is made as an example with respect to the case in which the driving image data in this exemplary embodiment are replaced with the mask data every horizontal line. However, it is also possible to apply modified examples 1 to 5 of the driving image data in the first exemplary embodiment.

Further, in the above exemplary embodiments, the explanation is made as an example with respect to the case in which the frame image data are read out three times in the period Tfi of a speed three times that of the frame period Tfr. However, the frame image data may be also read out four times or more in the period of a speed four times or more that of the frame period Tfr. In this case, similar effects can be obtained if at least one of the read-out image data except for the read-out image data read out at the boundary of adjacent frames among plural read-out image data of each frame is set to the driving image data as it is.

Figure 10:
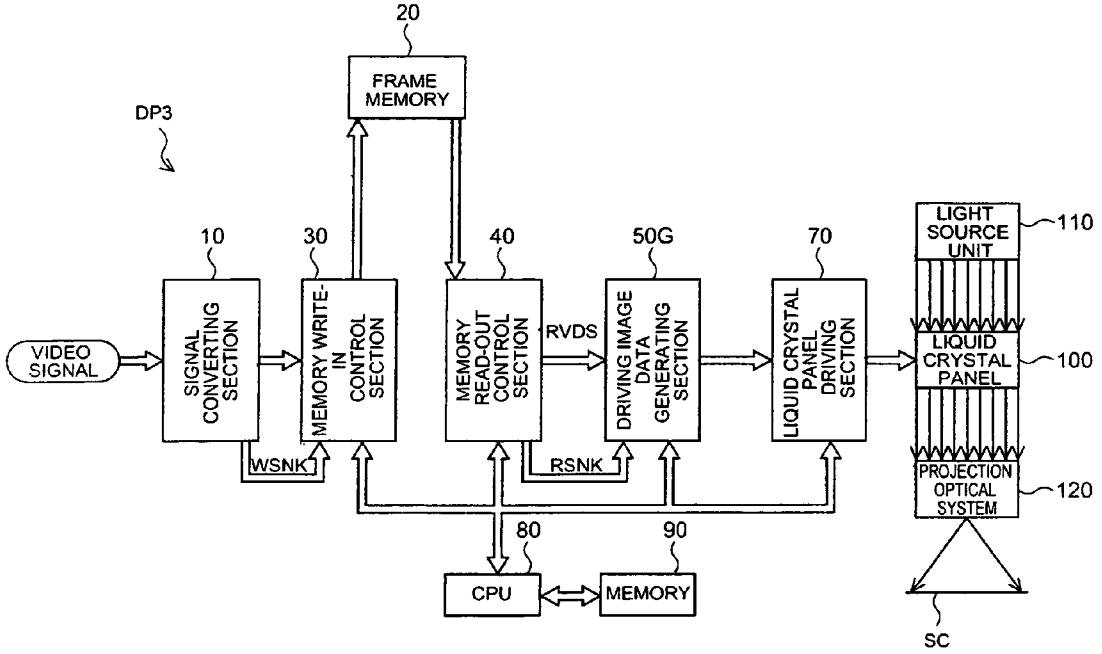
FIG. 10 is a block diagram showing the construction of an image display unit to which an image data processor as a third exemplary embodiment is applied.

FIG. 10 is a block diagram showing one example of the construction of an image display unit to which an image data processor as a third exemplary embodiment is applied. This image display unit DP3 is the same as the image display unit DP1 of the first exemplary embodiment except that the movement detecting section 60 of the image display unit DP1 (FIG. 1) of the first exemplary embodiment is omitted and the driving image data generating section 50 is correspondingly replaced with a driving image data generating section 50G. Therefore, in the following description, only this different point will be additionally explained.

Figure 11:
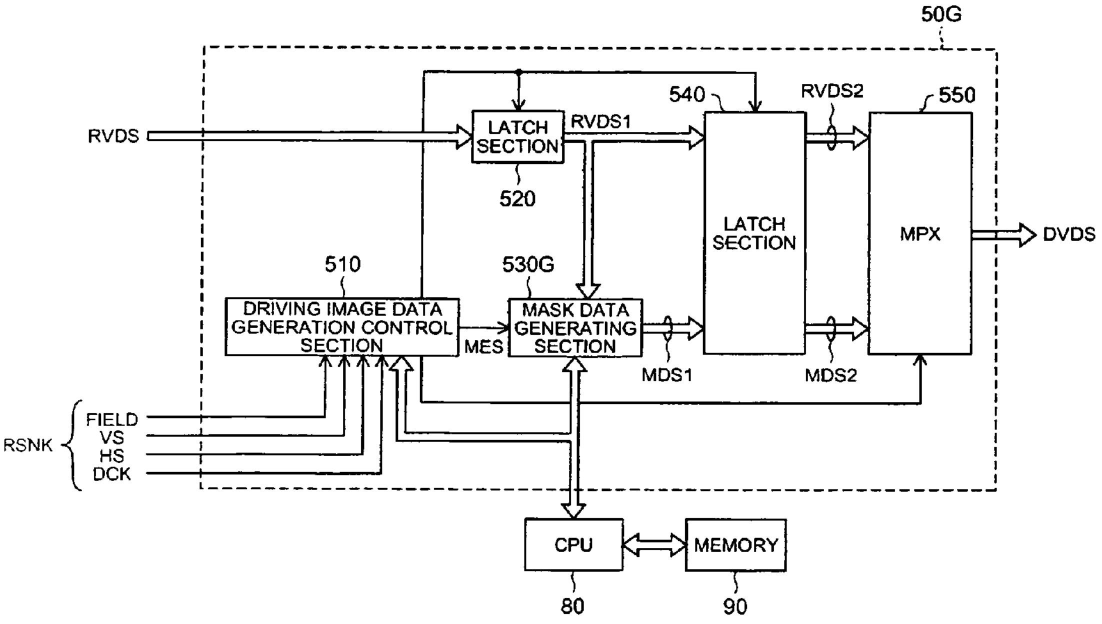
FIG. 11 is a schematic block diagram showing one example of the construction of a driving image data generating section 50G.

FIG. 11 is a schematic block diagram showing one example of the construction of the driving image data generating section 50G. This driving image data generating section 50G is the same as the driving image data generating section 50 except that the mask data generating section 530 of the driving image data generating section 50 (FIG. 4) of the first exemplary embodiment is replaced with a mask data generating section 530G to which no mask parameter signal MPS is inputted.

Figure 12:
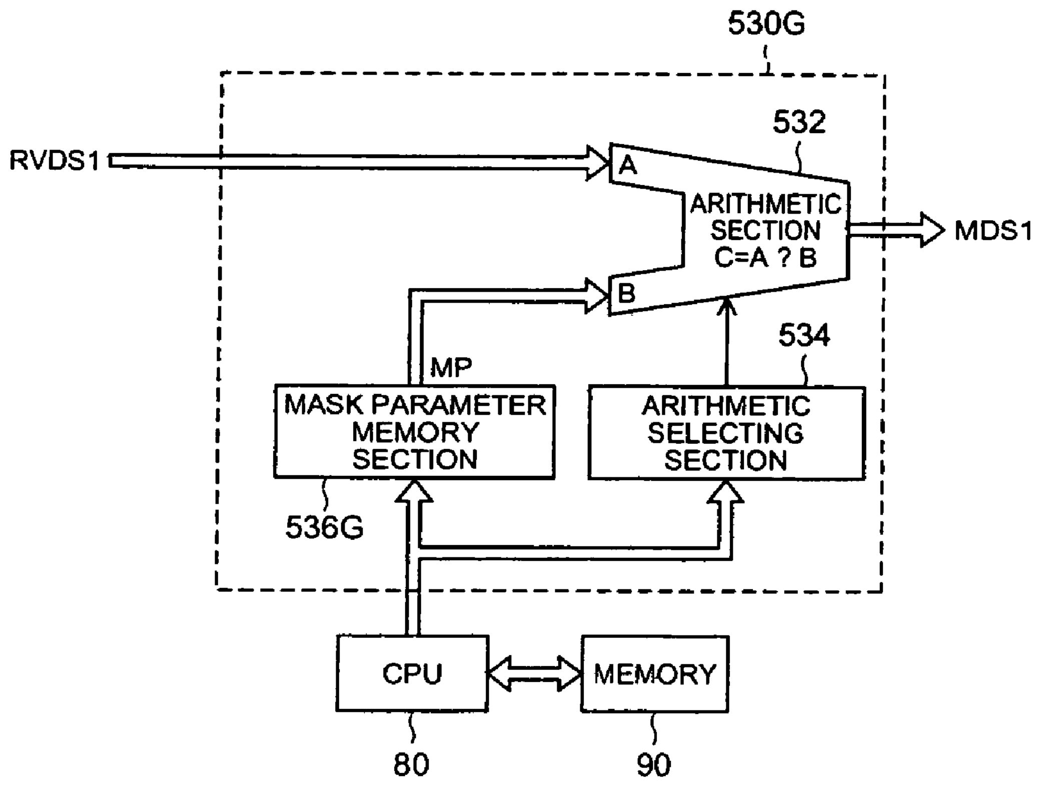
FIG. 12 is a schematic block diagram showing one example of the construction of a mask data generating section 530G.

FIG. 12 is a schematic block diagram showing the construction of the mask data generating section 530G. The construction of this mask data generating section 530G is the same as the mask data generating section 530 (FIG. 5) of the first exemplary embodiment except that the value of the mask parameter MP is supplied from the CPU 80 to a mask parameter memory section 536G.

In the case of this exemplary embodiment, for example, table data showing the relation of the moving amount Vm of an image and the mask parameter MP are stored to the memory 90. When a user designates a predetermined desirable moving amount, these table data are referred by the CPU 80 and the value of the corresponding mask parameter MP is calculated. The calculated value of the mask parameter MP is set to the mask parameter memory section 536G.

For example, the moving amount of the image may be designated by any method if the user can designate the predetermined desirable moving amount as in moving amounts (large), (middle) and (small) in a movement preferential mode. At this time, the values of the mask parameter MP corresponding to these moving amounts may be set in the table data so as to be related to each other.

In this exemplary embodiment, similar to the case of the first exemplary embodiment, the compensation can be also made such that the displayed dynamic image shows a smooth movement. Thus, the movement of the displayed dynamic image can be compensated without arranging a circuit for the movement compensation of a large scale as in the conventional example. Further, the compensation can be also made so as to reduce the afterimage phenomenon due to the sight sense of a human being with respect to the movement, and provide the smooth movement. Furthermore, the compensation can be also made so as to restrain the disturbance of a color balance caused by the afterimage phenomenon due to the sight sense of a human being, and provide an excellent color balance.

In this exemplary embodiment, the explanation of the driving image data generated in the driving image data generating section 50G is particularly omitted, but can be also set to one of the driving image data explained in the first exemplary embodiment and the second exemplary embodiment.

This invention is not limited to the above embodiments and embodiment modes, but can be executed in various modes in a scope not departing from its features.

In the above exemplary embodiments, the explanation is made as an example with respect to the case in which a pixel value calculated by arithmetically calculating the corresponding read-out image data and the mask parameter determined in accordance with the moving amount is set as the pixel value shown by the mask data. However, for example, the pixel value showing the image of a predetermined color determined in advance as in black, gray, etc. can be also used as the mask data.

In each of the above exemplary embodiments, it is explained as a premise that the read-out image data are replaced with the mask data in accordance with a pattern determined in advance, and the driving image data are generated. However, it should be understood that the invention is not limited to this case. The driving image data may be also generated by selecting one pattern from patterns corresponding to the driving image data of the first exemplary embodiment and the modified examples 1 to 5 of the driving image data in accordance with the moving direction and the moving amount of the dynamic image. For example, in the first exemplary embodiment, when a movement vector (horizontal vector) of the horizontal direction is greater than the movement vector (vertical vector) of the vertical direction in the first exemplary embodiment, it is considered that one of modified examples 2 to 5 of the driving image data is selected. In contrast to this, when the vertical vector is greater than the horizontal vector, it is considered that one of the driving image data of the first exemplary embodiment, the modified example 1 of the driving image data and the modified example 2 of the driving image data is selected. When the vertical vector and the horizontal vector are equal, it is considered that one of modified examples 4 and 5 of the driving image data is selected. Similar arguments are also made with respect to the second exemplary embodiment.

In the first and second exemplary embodiments, for example, the driving image data generation control section 510 can execute this selection on the basis of the moving direction and the moving amount shown by the movement vector detected by the moving amount detecting section 62. Otherwise, the CPU 80 may also execute this selection on the basis of the moving direction and the moving amount shown by the movement vector detected by the moving amount detecting section 62, and may also supply corresponding control information to the driving image data generation control section 510.

In the third exemplary embodiment, for example, the CPU 80 can execute the selection on the basis of predetermined desirable moving direction and moving amount designated by a user by supplying the corresponding control information to the driving image data generation control section 510.

The driving image data generating sections 50, 50G of the above respective exemplary embodiments are constructed such that the read-out image data signal RVDS read out of the frame memory 20 is sequentially latched by the first latch section 520. However, the driving image data generating section may be also constructed such that a new frame memory is arranged at the former stage of the first latch section 520, and the read-out image data signal RVDS is once written to the new frame memory and a new read-out image data signal outputted from the new frame memory is sequentially latched by the first latch section 520. In this case, an image data signal written to the new frame memory and an image data signal read out of the new frame memory may be set as the image data signal inputted to the movement detecting section 60.

In each of the above exemplary embodiments, the explanation is made as an example with respect to the case in which the generation of the mask data is executed with respect to each pixel of the read-out image data. However, a construction for executing the generation of the mask data with respect to only the pixel for executing replacement may be also set. In short, any construction may be used if the mask data corresponding to the pixel for executing the replacement can be generated and the replacement of the mask data can be executed.

In the above exemplary embodiments, the projector applying the liquid crystal panel thereto is explained as an example, but the invention can be also applied to a display unit of a direct seeing type instead of the projector. It is also possible to apply various image display devices such as PDP (Plasma Display Panel), ELD (Electro Luminescence Display), etc. in addition to the liquid crystal panel. The invention can be also applied to a projector using DMD (Digital Micromirror Device as a trademark of TI (Texas Instruments) Corporation).

In the above exemplary embodiments, the explanation is made as an example with respect to the case in which each block of the memory write-in control section, the memory read-out control section, the driving image data generating section and the moving amount detecting section for generating the driving image data is constructed by hardware. However, each block may be also constructed by software so as to realize at least one partial block by reading-out and executing a computer program by the CPU.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. An image data processor for generating driving image data for operating an image display device, comprising:

an image memory;

a write-in control section that sequentially writes-in plural frame image data having a predetermined frame rate to the image memory;

a read-out control section that reads-out the frame image data 1 times (1 is an integer of 2 or more) at a rate 1 times the frame rate with every frame image data written into the image memory;

a driving image data generating section that generates the driving image data corresponding to each read-out image data sequentially read out of the image memory;

in the read-out image data corresponding to a certain first frame and the read-out image data corresponding to a second frame continued to the first frame, the driving image data generating section setting image data provided by replacing at least one portion of each read-out image data with mask data to the driving image data with respect to first read-out image data of a 1-th period finally read out as the read-out image data corresponding to the first frame, and second read-out image data of the first period firstly read out as the read-out image data corresponding to the second frame;

the driving image data generating section also setting the read-out image data to the driving image data as they are with respect to the read-out image data read out in at least one period among the read-out image data except for the first read-out image data of the first frame; and the driving image data generating section also setting the read-out image data to the driving image data as they are with respect to the read-out image data read out in at least one period among the read-out image data except for the second read-out image data of the second frame.

2. The image data processor according to claim 1, a pixel value shown by the mask data being determined by arithmetically processing the read-out image data corresponding to a pixel for arranging the mask data on the basis of a predetermined parameter determined in accordance with a moving amount of the image shown by the read-out image data corresponding to the generated driving image data.

3. The image data processor according to claim 2, the image data processor further comprising:

a moving amount detecting section that detects the moving amount of the image shown by the frame image data with every frame image data sequentially written into the image memory as the moving amount of the image shown by the read-out image data corresponding to the generated driving image data; and a parameter determining section that determines the predetermined parameter in accordance with the detected moving amount.

4. The image data processor according to claim 1, a pixel value shown by the mask data being a pixel value showing the image of a predetermined color.

5. The image data processor according to claim 4, the predetermined color being black.

6. The image data processor according to claim 1, with respect to the driving image data corresponding to the first read-out image data and the driving image data corresponding to the second read-out image data, the read-out image data and the mask data being alternately arranged every m horizontal lines (m is an integer of 1 or more) of the image displayed by the image display device, and the arranging orders of the read-out image data and the mask data being different from each other.

7. The image data processor according to claim 6, m=1 being set.

8. The image data processor according to claim 1, with respect to the driving image data corresponding to the first read-out image data and the driving image data corresponding to the second read-out image data, the read-out image data and the mask data being alternately arranged every n vertical lines (n is an integer of 1 or more) of the image displayed by the image display device, and the arranging orders of the read-out image data and the mask data being different from each other.

9. The image data processor according to claim 8, n=1 being set.

10. The image data processor according to claim 1, with respect to the driving image data corresponding to the first read-out image data and the driving image data corresponding to the second read-out image data, the read-out image data and the mask data being alternately arranged in the horizontal direction and the vertical direction of the image displayed in the image display device in a block unit of r-pixels (r is an integer of 1 or more) in the horizontal direction and s-pixels (s is an integer of 1 or more) in the vertical direction, and the arranging orders of the read-out image data and the mask data being different from each other.

11. The image data processor according to claim 10, r=s=1 being set.

12. The image data processor according to claim 1, the driving image data generating section switching arranging patterns of the mask data within the driving image data corresponding to the first read-out image data and the driving image data corresponding to the second read-out image data in accordance with a moving direction and a moving amount of the image shown by the read-out image data corresponding to the generated driving image data.

13. The image data processor according to claim 12, the image data processor further comprising a moving amount detecting section that detects the moving direction and the moving amount of the image shown by the frame image data with every frame image data sequentially written into the image memory as the moving direction and the moving amount of the image shown by the read-out image data corresponding to the generated driving image data.

14. The image data processor according to claim 3, the moving amount detecting section detecting the moving direction and the moving amount of the image shown by the frame image data with every frame image data sequentially written into the image memory as the moving direction and the moving amount of the image shown by the read-out image data corresponding to the generated driving image data.

15. An image display unit, comprising:

the image data processor according to claim 1; and the image display device.

16. An image data processing method for generating driving image data for operating an image display device, comprising:

sequentially writing-in plural frame image data having a predetermined frame rate to an image memory;

reading-out the frame image data 1 times (1 is an integer of 2 or more) at a rate 1 times the frame rate with every frame image data written into the image memory;

generating the driving image data corresponding to each read-out image data sequentially read out of the image memory;

in the read-out image data corresponding to a certain first frame and the read-out image data corresponding to a second frame continued to the first frame, the process for generating the driving image data setting image data provided by replacing at least one portion of each read-out image data with mask data to the driving image data with respect to first read-out image data of a 1-th period finally read out as the read-out image data corresponding to the first frame, and second read-out image data of the first period firstly read out as the read-out image data corresponding to the second frame;

the process for generating the driving image data also setting the read-out image data to the driving image data as they are with respect to the read-out image data read out in at least one period among the read-out image data except for the first read-out image data of the first frame; and the process for generating the driving image data also setting the read-out image data to the driving image data as they are with respect to the read-out image data read out in at least one period among the read-out image data except for the second read-out image data of the second frame.

* * * * *